United States Patent
Iino et al.

(10) Patent No.: US 8,171,313 B2
(45) Date of Patent: May 1, 2012

(54) COMMUNICATION DEVICE AND POWER SUPPLY METHOD

(75) Inventors: Satoshi Iino, Yokohama (JP); Kazumasa Gomyo, Yokohama (JP); Tomohiro Ishihara, Yokohama (JP); Yuji Hashimoto, Yokohama (JP)

(73) Assignee: Panasonic Corporation, Osaka (JP)

( * ) Notice: Subject to any disclaimer, the term of this patent is extended or adjusted under 35 U.S.C. 154(b) by 408 days.

(21) Appl. No.: 12/521,858

(22) PCT Filed: Jan. 18, 2007

(86) PCT No.: PCT/JP2007/050693
§ 371 (c)(1),
(2), (4) Date: Jun. 30, 2009

(87) PCT Pub. No.: WO2008/087727
PCT Pub. Date: Jul. 24, 2008

(65) Prior Publication Data
US 2010/0115308 A1 May 6, 2010

(51) Int. Cl.
*G06F 1/32* (2006.01)
(52) U.S. Cl. ........ 713/300; 713/310; 713/320; 713/321; 713/322; 713/323; 713/324; 713/330; 713/340; 455/572; 455/574; 340/870.06; 709/230; 710/10; 710/105
(58) Field of Classification Search .................. 713/300, 713/310, 320–324, 330, 340; 455/572, 574; 340/870.06; 709/230; 710/10, 105
See application file for complete search history.

(56) References Cited

U.S. PATENT DOCUMENTS

| 6,125,404 | A | * | 9/2000 | Vaglica et al. ................ 713/375 |
| 7,433,069 | B2 | * | 10/2008 | Masuda et al. ............... 358/1.15 |
| 2010/0017863 | A1 | * | 1/2010 | Chung et al. ..................... 726/7 |

FOREIGN PATENT DOCUMENTS

| JP | 2004-192256 A | 7/2004 |
| JP | 2005-267099 A | 9/2005 |

OTHER PUBLICATIONS

International Search Report dated Apr. 6, 2007, in corresponding International Application No. PCT/JP2007/050693, filed Jan. 18, 2007.

* cited by examiner

*Primary Examiner* — M Elamin
(74) *Attorney, Agent, or Firm* — Seed IP Law Group PLLC

(57) ABSTRACT

Provided is a communication device capable of efficiently performing a power supply control when reducing power consumption by reducing the time during which the power is supplied. In the device, a CPU power saving control unit (301) switches between a normal mode in which the power is supplied to a CPU (302) and a low power consumption mode in which the power supply is stopped at predetermined timing. A session management table (321) stores transmission intervals before and after conversion. An information conversion section (322) converts the transmission intervals of session maintenance messages according to a predetermined rule so that the transmission intervals of the session maintenance messages of respective protocols are mutually synchronized between the protocols. A control unit (323) controls the CPU power saving control unit (301) so as to transmit an appropriate session maintenance message at the transmission timing of a session maintenance message and also controls it so as to switch between the normal mode and the low power consumption mode at the predetermined timing.

8 Claims, 6 Drawing Sheets

| PROCESSING NAME | SESSION-MAINTAINING MESSAGE TRANSMISSION INTERVAL (BEFORE CONVERSION) | SESSION-MAINTAINING MESSAGE TRANSMISSION INTERVAL (AFTER CONVERSION) |
|---|---|---|
| PROTOCOL A | 3600 SECONDS | 3600 SECONDS |
| PROTOCOL B | 50 SECONDS | 30 SECONDS |
| PROTOCOL C | 30 SECONDS | 30 SECONDS |

COMMUNICATION DEVICE AND POWER SUPPLY METHOD

TECHNICAL FIELD

The present invention relates to a communication apparatus and a method of supplying power. More particularly, the present invention relates to a communication apparatus and method of supplying power, for transmitting packets on a regular basis to maintain session.

BACKGROUND ART

Among mobile terminal apparatuses that mount protocol processing software such as TCP (Transmission Control Protocol)/IP (Internet Protocol), one that reduces CPU power consumption is known heretofore (e.g., Patent Document 1).

Patent Document 1 describes a technique of realizing low power consumption by predicting the time to transmit or receive the signal of each protocol and switching the CPU operation mode between a low power consumption operation mode and a normal mode.

Since mobile terminal apparatuses operate on a battery as a power supply, power consumption needs to be reduced to the lowest possible level. Especially processing in the CPU has a great influence on power consumption, and it is therefore necessary to avoid processing in the CPU as much as possible when the user does not operate the mobile terminal apparatus.

Furthermore, with increasingly sophisticated demands for telephone functions and security functions in recent years, mobile terminal apparatuses have come to feature software that performs a variety of types of protocol processing. For example, mobile terminal apparatuses may use PPP (Point-to-Point Protocol), IP (IPsec (Security Architecture for IP)), UDP (User Datagram Protocol), SIP (Session Initiation Protocol) and NAT (Network Address Translator) at the same time. Furthermore, software for performing protocol processing installed in a mobile terminal apparatus often sends/receives packets for maintaining session, on a regular basis, so as to maintain session even while the user performs no operation. For example, the "register request" message of SIP is a session-maintaining message. Moreover, PPP, IPsec or NAT can likewise use keep-alive messages for maintaining session.

FIG. 1 shows the timing of sending conventional session-maintaining messages. Since each message is sent in a separate cycle per protocol, the CPU operates at asynchronous timings between the protocols.

Patent Document 1: Japanese Patent Application Laid-Open No. 2004-192256

DISCLOSURE OF INVENTION

Problems to be Solved by the Invention

However, in a conventional apparatus, since the CPU operates asynchronously between different protocols, there is a problem that the power supply needs to be driven every time a message of a different protocol is sent. Timing at which the CPU transitions from a low power consumption mode to a normal mode must precede the timing the CPU starts processing operation. Therefore, when the CPU transitions from the low power consumption mode to the normal mode, the period to supply power to the CPU must be longer than the period in which the CPU actually performs processing. Thus, even if low power control on the CPU is exercised by predicting the time until transmission or reception is carried out as described in Patent Document 1, there is a problem that, as the number of protocols to send session-maintaining messages increases, the number of times the CPU transitions from a low power consumption mode to a normal mode increases, and, as a result, the period to supply power to the CPU increases, which renders power control on the CPU inefficient.

It is therefore an object of the present invention to provide a communication apparatus and a power supply method capable for efficiently performing power control to achieve low power consumption by reducing the time to supply power.

Means for Solving the Problem

The communication apparatus of the present invention adopts a configuration including: a protocol processing section that executes processing of a plurality of different protocols; a timing adjusting section that adjusts transmission intervals of messages such that the messages of the respective protocols for maintaining a connection with a communicating party are transmitted in synchronization with each other; a transmission section that transmits the messages of the respective protocols at the adjusted transmission intervals; and a power save control section that stops supply of power in a time period in which processing of the protocols is not carried out and a time period in which the messages are not transmitted.

The power supply method of the present invention includes the steps of: performing processing of a plurality of different protocols; adjusting transmission intervals of messages such that the messages of the respective protocols for maintaining a connection with a communicating party are transmitted in synchronization with each other; transmitting the messages of the respective protocols at the adjusted transmission intervals; and stopping supply of power in a time period in which processing on the protocols is not carried out and a time period in which the messages are not transmitted.

Advantageous Effect of the Invention

The present invention makes it possible to perform power control efficiently to achieve low power consumption by reducing the time in which power is supplied.

BEST MODE FOR CARRYING OUT THE INVENTION

Hereinafter, an embodiment of the present invention will be explained in detail with reference to the accompanying drawings.

Embodiment

Figure 2:
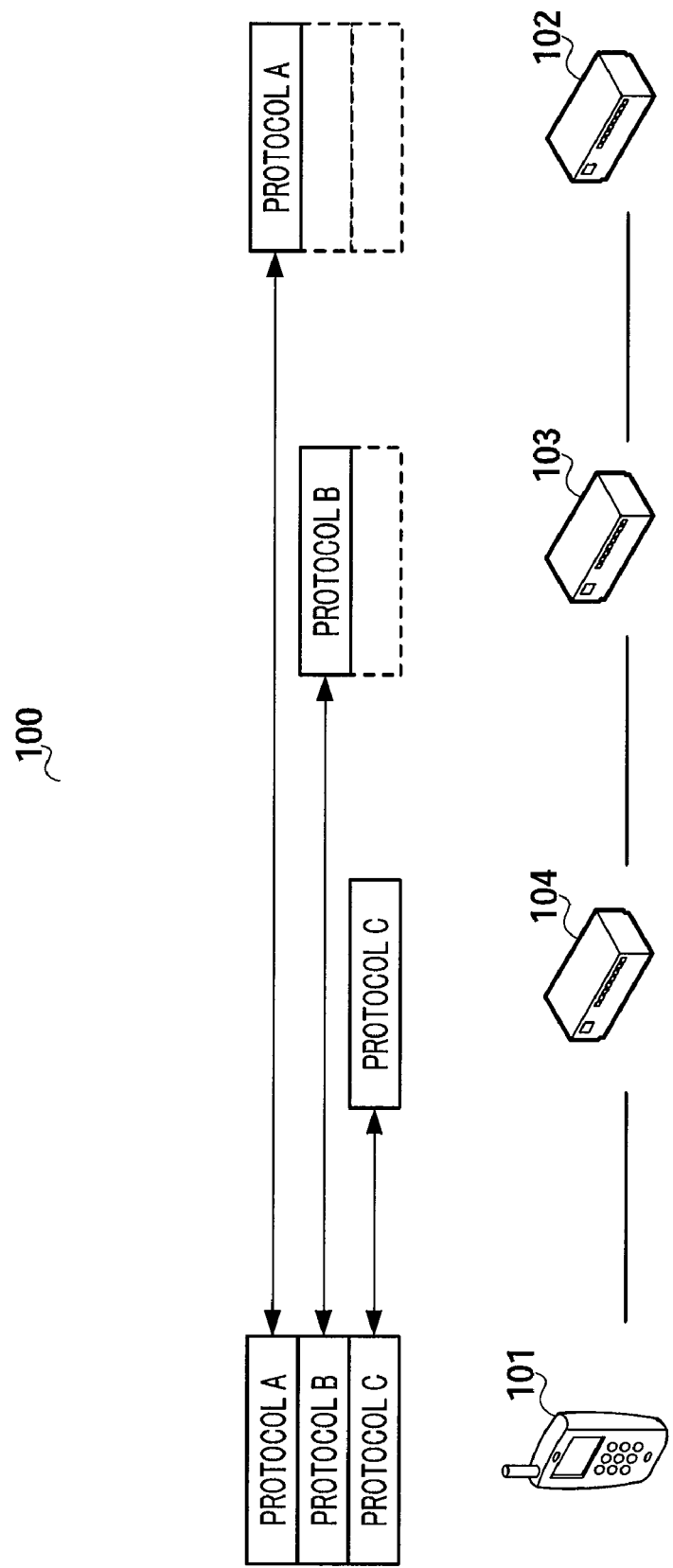
FIG. 2 shows a communication system according to an embodiment of the present invention.

FIG. 2 shows communication system 100 according to an embodiment of the present invention. Communication system 100 is comprised of communication apparatus 101, protocol termination apparatus 102 that can execute protocol processing of protocol A, protocol termination apparatus 103 that can execute protocol processing of protocol B and protocol termination apparatus 104 that can execute protocol processing of protocol C. Furthermore, communication apparatus 101 is equipped with software for performing protocol processing on three protocols; protocol A, protocol B and protocol C. Protocol termination apparatuses 102 to 104 are other parties of communication for communication apparatus 101.

Figure 3:
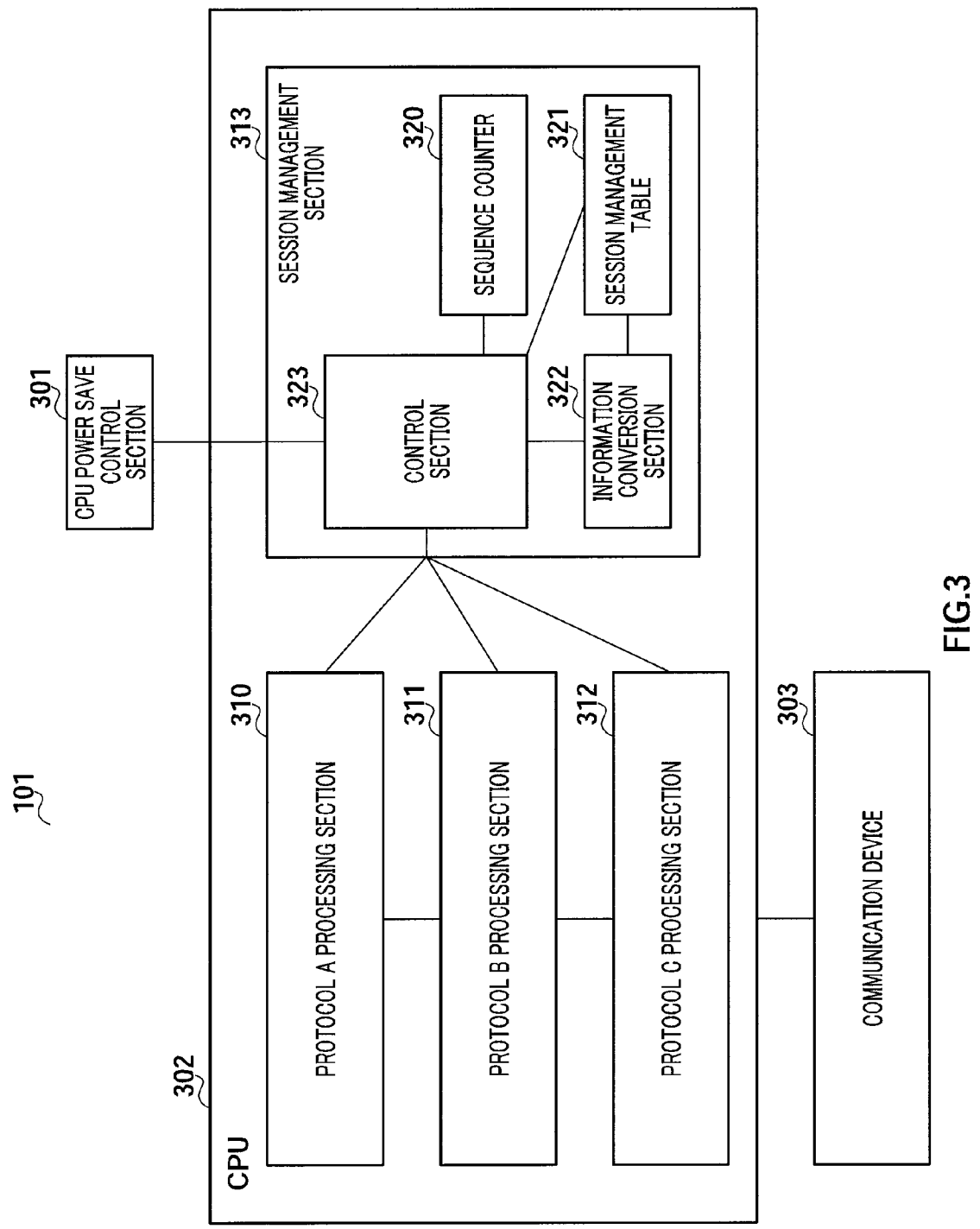
FIG. 3 is a block diagram showing a configuration of a communication apparatus according to the embodiment of the present invention.

Next, the configuration of communication apparatus 101 will be explained using FIG. 3. FIG. 3 is a block diagram showing the configuration of communication apparatus 101. Communication apparatus 101 is a communication terminal apparatus such as a mobile phone.

Communication apparatus 101 is mainly comprised of CPU power save control section 301, CPU 302 and communication device 303. Furthermore, CPU 302 is mainly comprised of protocol A processing section 310, protocol B processing section 311, protocol C processing section 312 and session management section 313. Furthermore, session management section 313 is comprised of sequence counter 320, session management table 321, information conversion section 322 and control section 323.

CPU power save control section 301 is intended to control supply of power to CPU 302 and switches between a normal mode, in which power is supplied to CPU 302 under the control of control section 323, which will be described later, and a low power consumption mode, in which supply of power to CPU 302 is stopped, at predetermined timing. Here, CPU 302 can set up two operation modes of normal mode and low power consumption mode. The normal mode is a mode that enables session management processing in normal protocol processing. Furthermore, the low power consumption mode is a mode in which protocol processing and session management processing cannot be performed and in which interrupts from CPU power save control section 301 and others are received.

Communication device 303 is a device that performs communication processing and performs processing for carrying out communication with protocol termination apparatuses 102 to 104 under the control of CPU 302. To be more specific, communication device 303 modulates a signal after execution of protocol processing by protocol A processing section 310, protocol B processing section 311 or protocol C processing section 312. Furthermore, communication device 303 modulates session-maintaining messages for maintaining connections with protocol termination apparatuses 102 to 104 received as input from protocol A processing section 310, protocol B processing section 311 or protocol C processing section 312. Communication device 303 then up-converts the modulated signals from a baseband frequency to a radio frequency and transmits the signals from an antenna (not shown). Furthermore, communication device 303 receives signals transmitted from protocol termination apparatuses 102 to 104 through the antenna, down-converts the received signals from a radio frequency to a baseband frequency, demodulates the down-converted signals and outputs the signals to CPU 302.

Protocol A processing section 310 executes processing of protocol A, which is an arbitrary protocol, and outputs the processed signal to communication device 303. Furthermore, protocol A processing section 310 creates a session-maintaining message for maintaining the connection with protocol termination apparatus 102 at timing controlled by control section 323 and outputs the created session-maintaining message to communication device 303.

Protocol B processing section 311 executes processing of protocol B, which is an arbitrary protocol different from protocol A, and outputs the processed signal to communication device 303. Furthermore, protocol B processing section 311 creates a session-maintaining message for maintaining the connection with protocol termination apparatus 103 at timing controlled by control section 323 and outputs the created session-maintaining message to communication device 303.

Protocol C processing section 312 executes processing of protocol C, which is an arbitrary protocol different from protocol A and protocol B, and outputs the processed signal to communication device 303. Furthermore, protocol C processing section 312 creates a session-maintaining message for maintaining the connection with protocol termination apparatus 104 at timing controlled by control section 323 and outputs the created session-maintaining message to communication device 303. Protocol A, protocol B and protocol C may be protocols of the same layer or may be protocols of different layers.

Sequence counter 320 is a counter for managing periodic transmission of a session-maintaining message and performs counting sequentially starting from "0" after reset.

Session management table 321 is a table that records the interval for the session-maintaining message of each protocol. To be more specific, session management table 321 stores the transmission interval of the session-maintaining message of each protocol before conversion, and also stores, when a converted transmission interval is received as input from information conversion section 322, the inputted converted transmission interval.

Information conversion section 322 converts the transmission interval of a session-maintaining message received as input from control section 323 according to predetermined rules such that transmission intervals of session-maintaining messages of respective protocols are synchronized with each other among the protocols. Information conversion section 322 outputs the converted transmission intervals to session management table 321.

Control section 323 collects session management information and performs session maintenance management on each protocol. To be more specific, control section 323 acquires a transmission interval before conversion from session management table 321 and outputs the acquired transmission interval before conversion to information conversion section 322. Furthermore, control section 323 controls, when a count value of sequence counter 320 becomes the transmission timing of a session-maintaining message at a converted transmission interval stored in session management table 321, corresponding protocol A processing section 310, protocol B processing section 311 or protocol C processing section 312 to transmit the session-maintaining message. Furthermore, control section 323 controls CPU power save control section 301 so as to switch between the normal mode and the low power consumption mode at predetermined timing based on the converted transmission intervals stored in session management table 321. To be more specific, control section 323 controls CPU power save control section 301 so as to switch the mode to the low power consumption mode for a time period in which no session-maintaining message of each protocol is transmitted.

Figure 4:
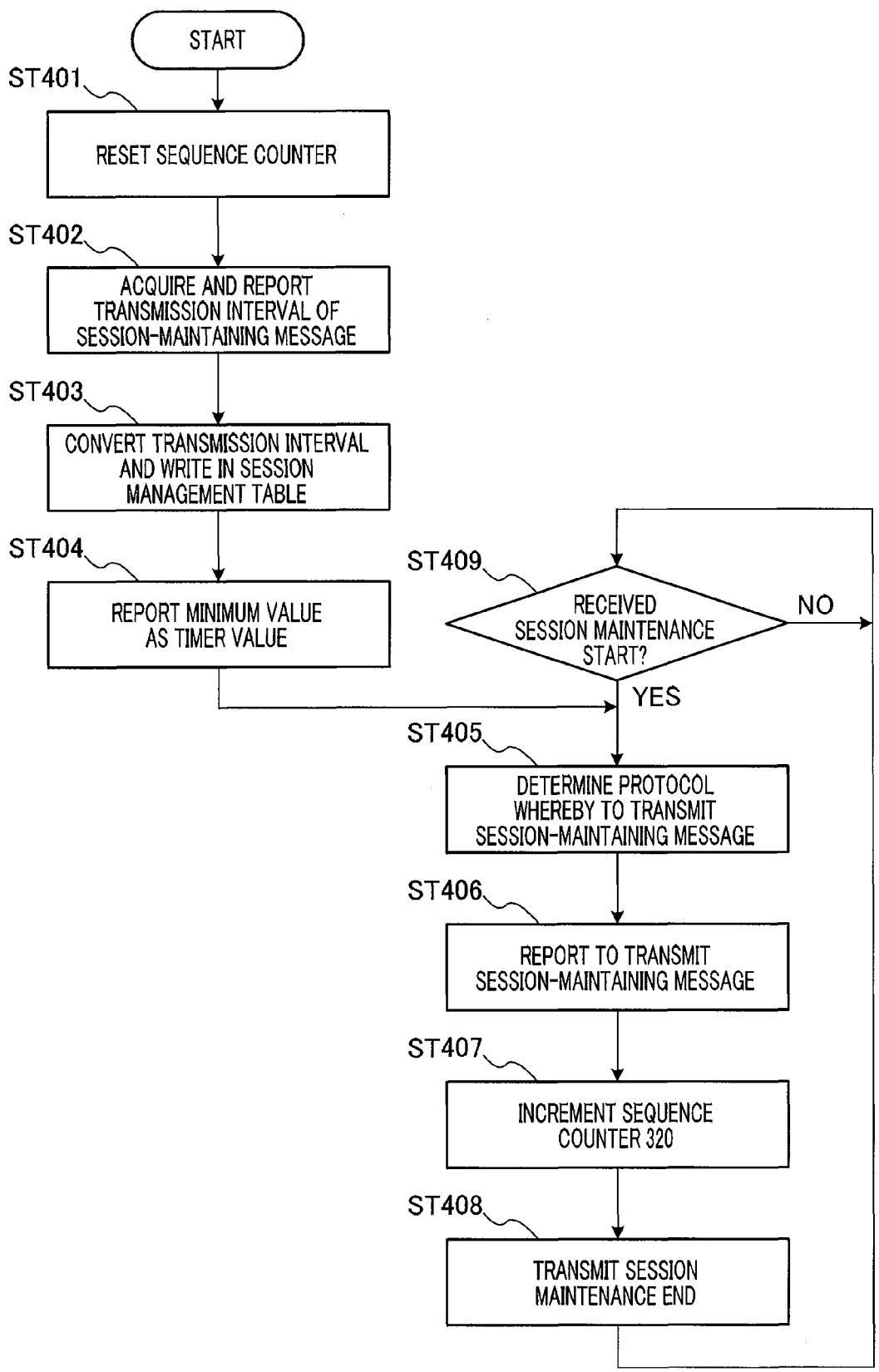
FIG. 4 is a flowchart showing operations of the communication apparatus according to the embodiment of the present invention.
Figures 5, 6:
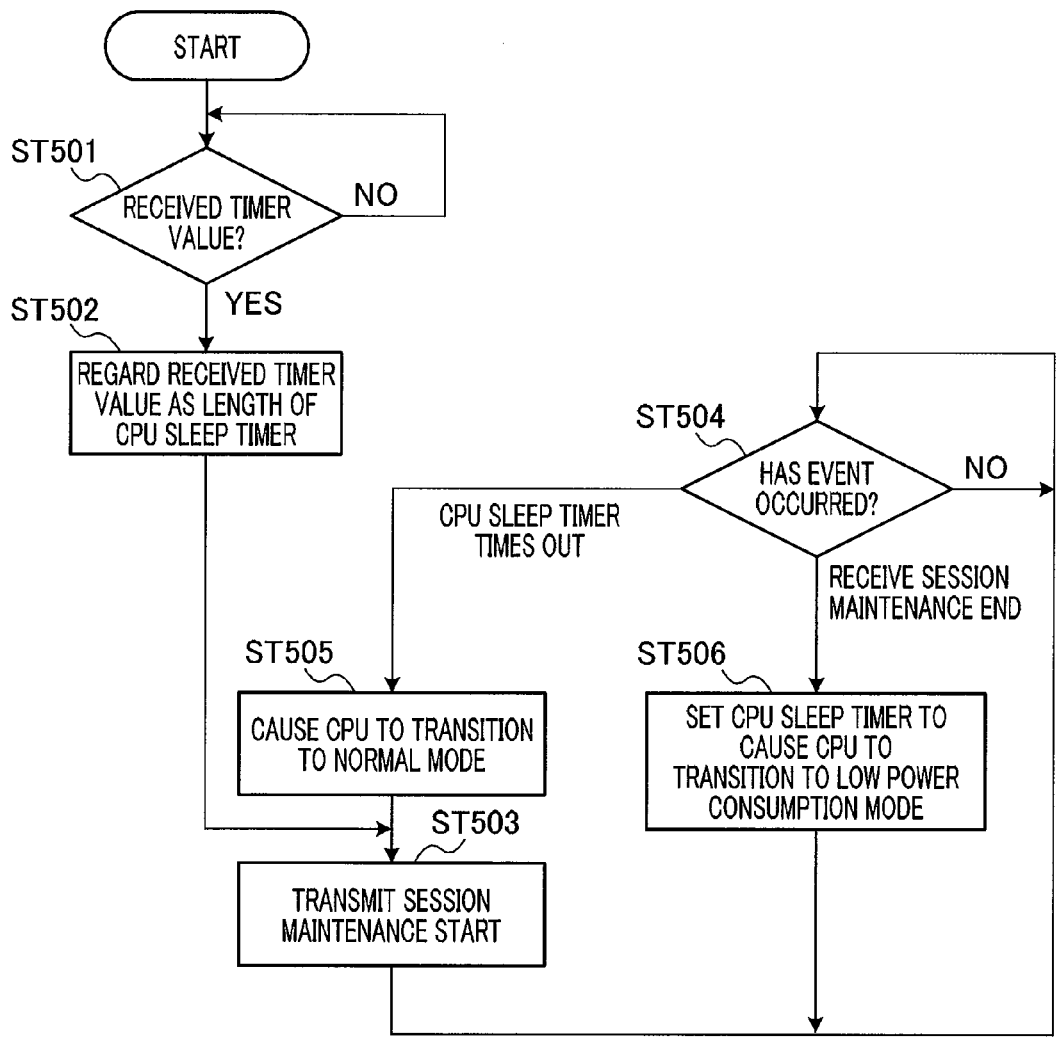
FIG. 5 is a flowchart showing operations of the communication apparatus according to the embodiment of the present invention.
FIG. 6 shows a session management table according to the embodiment of the present invention.

Next, operations of communication apparatus 101 will be explained using FIG. 4 and FIG. 5. FIG. 4 is a flowchart showing operations of session management section 313 of communication apparatus 101 and FIG. 5 is a flowchart showing operations of CPU power save control section 301 of communication apparatus 101.

First, operations of session management section 313 will be explained using FIG. 4.

Control section 323 of session management section 313 resets sequence counter 320 to set the count value to "0" (step ST401).

Next, control section 323 acquires the transmission interval of a session-maintaining message before conversion of each protocol from session management table 321 and reports the acquired transmission interval before conversion to information conversion section 322 (step ST402).

Next, information conversion section 322 converts the acquired transmission interval before conversion according to predetermined rules and writes the converted transmission interval in session management table 321 (step ST403). For example, information conversion section 322 converts the acquired transmission interval of the session-maintaining message according to equation 1 and equation 2, which are the predetermined rules, and writes the converted session-maintaining message in session management table 321.

$$Zi = \text{the transmission interval of a protocol before conversion, divided by X} \quad \text{(Equation 1)}$$

$$Zi \times X = \text{the transmission interval of the protocol after conversion} \quad \text{(Equation 2)}$$

where X is the minimum value amongst the transmission intervals of the session-maintaining messages of all protocols.

i is the number of protocols.

AdivB is the value obtained by discarding all digits to the right of the decimal point of A/B.

FIG. 6 shows an example of session management table 321. In FIG. 6, the minimum value of transmission intervals of session-maintaining messages of all protocols is the transmission interval of protocol C, and therefore X=30. Therefore, for protocol A, Zi=3600 divided by 30=120 from equation 1, and the converted transmission interval=120× 30=3600 from equation 2. Furthermore, for protocol B, Zi=50 divided by 30=1 from equation 1 and the converted transmission interval=1×30=30 from equation 2. By this means, the converted transmission interval of protocol A is 3600 seconds, the converted transmission interval of protocol B is 30 seconds and the converted transmission interval of protocol C is 30 seconds. Thus, session management table 321 can store a transmission interval before conversion and a converted transmission interval for each protocol.

Returning to FIG. 4, control section 323 then reports the minimum value of the converted transmission intervals stored in session management table 321 to CPU power save control section 301 as a timer value (step ST404).

Next, control section 323 determines a protocol for transmitting a session-maintaining message based on the count value of sequence counter 320 and the converted transmission interval stored in session management table 321 (step ST405).

Next, in the case of FIG. 6, control section 323 sends a report to protocol A processing section 310 to transmit the session-maintaining message at 3600-second transmission intervals and sends a report to protocol B processing section 311 or protocol C processing section 312 to transmit the session-maintaining message at 30-second transmission intervals (step ST406). To be more specific, when the count value of sequence counter 320 is "0," control section 323 sends reports to all the protocols of protocol A processing section 310, protocol B processing section 311 and protocol C processing section 312 to transmit a session-maintaining message. From FIG. 6, since the converted transmission interval for the session-maintaining message of protocol A is 3600 seconds and the converted transmission interval for the session-maintaining messages of protocol B and protocol C is 30 seconds, the transmission intervals of the protocols are both multiples of 30. Therefore, when, for example, sequence counter 320 counts up the count value by "1" per second, control section 323 transmits the corresponding session-maintaining messages of protocol A to protocol C only when the count value of sequence counter 320 is a multiple of 30. This allows communication apparatus 101 to transmit the session-maintaining messages of respective protocols in synchronization with each other among the protocols, that is, at transmission timings where the least common multiple is 30 seconds.

Next, control section 323 increments sequence counter 320 (step ST407) and transmits a session maintenance end to CPU power save control section 301 (step ST408).

Next, control section 323 decides whether or not a session maintenance start has been received from CPU power save control section 301 (step ST409).

When control section 323 receives a session maintenance start from CPU power save control section 301, session management section 313 performs processing in step ST405 to step ST408 and when control section 323 does not receive a session maintenance start from CPU power save control section 301, session management section 313 waits for an event until control section 323 receives the session maintenance start, from CPU power save control section 301 (step ST409).

Next, operations of CPU power save control section 301 will be explained using FIG. 5.

First, CPU power save control section 301 decides whether or not a timer value has been received from control section 323 of session management section 313 (step ST501).

When CPU power save control section 301 does not receive a timer value from control section 323, CPU power save control section 301 waits for an event until the timer value is received (step ST501) and when CPU power save control section 301 has received the timer value from control section 323, CPU power save control section 301 regards the received timer value as the length of a sleep timer of CPU 302 (step ST502). Here, the "sleep timer" refers to a timer that determines the time to stop supply of power to CPU 302.

Next, CPU power save control section 301 transmits the session maintenance start to control section 323 (step ST503) and then starts to wait for an event. Hereafter, CPU power save control section 301 will operate whenever triggered by an event.

Next, CPU power save control section 301 decides whether or not an event has occurred (step ST504). Here, an "event" occurs on two occasions, an even is the time CPU power save control section 301 receives a session maintenance end from control section 323 or an even is the time the sleep timer expires.

Upon receiving an event that the sleep timer has timed out, CPU power save control section 301 causes CPU 302 to transition from the low power consumption mode to the normal mode (step ST505) and transmits a session maintenance start to control section 323 (step ST503). CPU power save control section 301 then waits for an event again (step ST504).

On the other hand, upon receiving an event of session maintenance end from control section 323 in step ST504, CPU power save control section 301 starts measuring the time period in which supply of power is stopped using the sleep timer and causes CPU 302 to transition from the normal mode to the low power consumption mode (step ST506). CPU power save control section 301 then starts to wait for an event again (step ST504).

Figure 1:
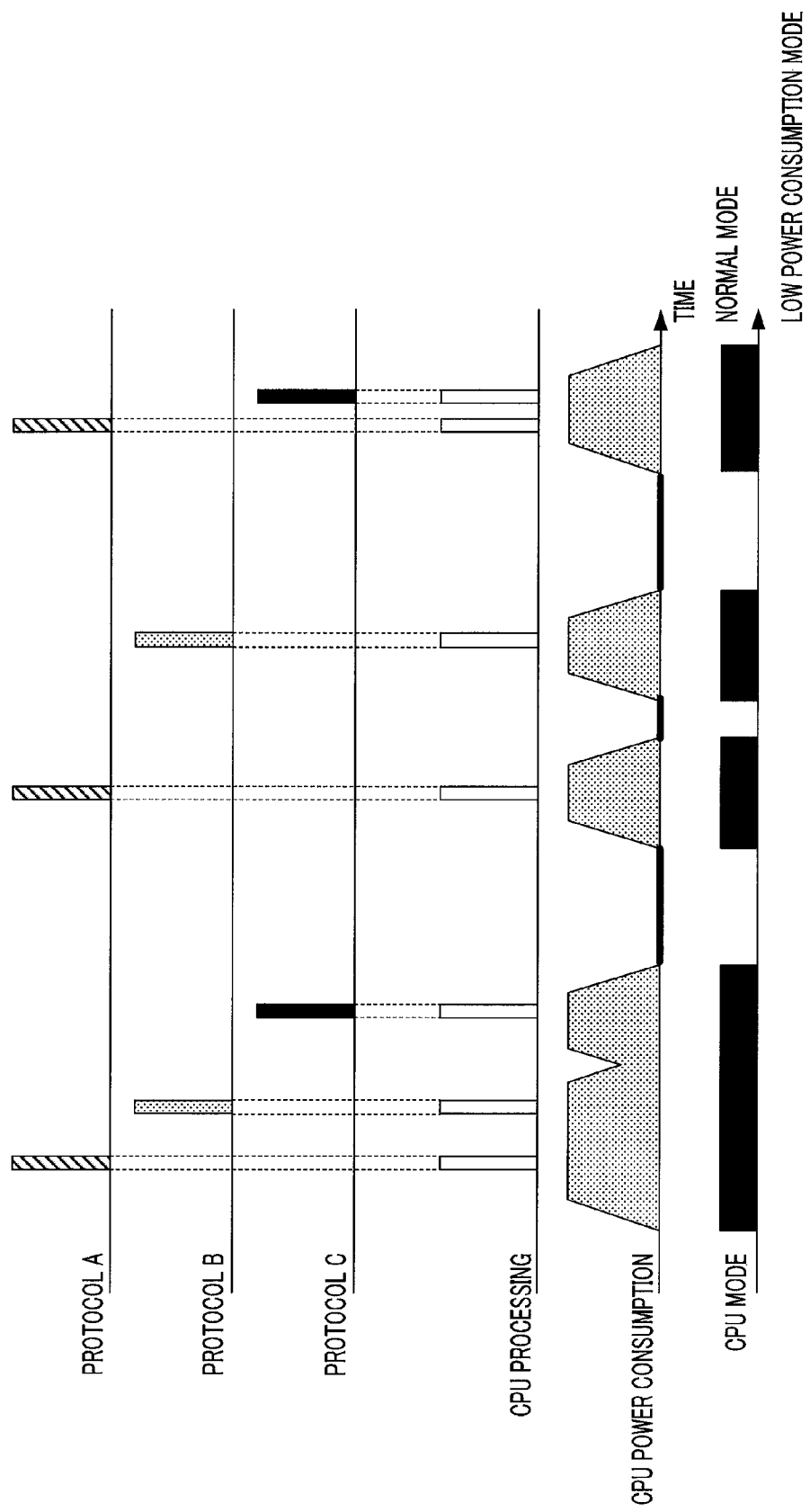
FIG. 1 shows the transmission timing of conventional session-maintaining messages.
Figure 7:
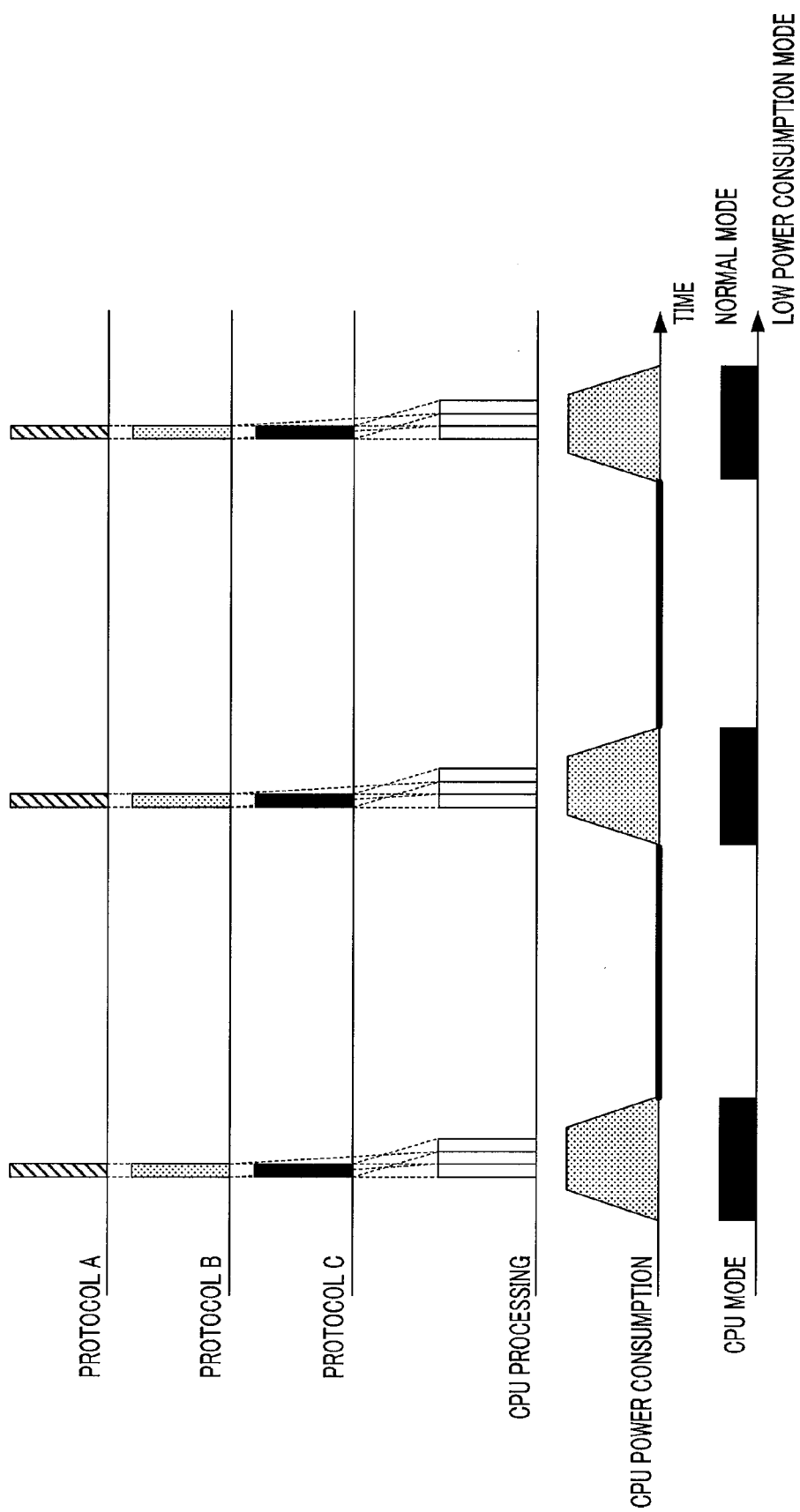
FIG. 7 shows the transmission timing of session-maintaining messages according to the embodiment of the present invention.

FIG. 7 shows the transmission timing of session-maintaining messages according to the present embodiment. As is clear from FIG. 1 and FIG. 7, the present embodiment can reduce the frequently with which the CPU transitions from the low power consumption mode to the normal mode compared to the prior art.

Thus, according to the present embodiment, session-maintaining messages are collectively managed and transmitted in synchronization with each other among protocols, and therefore it is possible to reduce the frequency at which the CPU transitions from the low power consumption mode to the normal mode, secure a longer time for the CPU to rest compared to the prior art and reduce the power consumption in the CPU compared to the prior art. This effect is especially conspicuous when there is no operation from the user or no reception of traffic from the network side. Furthermore, according to the present embodiment, upon conversion of the transmission interval of a session-maintaining message, the transmission interval is made the same as or shorter than the transmission interval before conversion, and therefore it is possible to reduce power consumption in the CPU without impairing the function of session maintenance management.

A communication apparatus that processes three protocols of protocol A to protocol C has been explained with the above embodiment, but the present invention is not limited to this and is also applicable to a communication apparatus that processes an arbitrary number of protocols. Furthermore, the above embodiment is applicable to a communication apparatus that executes an arbitrary protocol. Furthermore, a case has been explained with the above embodiment where the session-maintaining messages of respective protocols are transmitted at converted transmission intervals, but the present invention is not limited to this, and it is equally possible to transmit session-maintaining messages of respective protocols in synchronization with each other, at arbitrary timing providing even shorter transmission intervals than converted transmission intervals. In the case of FIG. 6, for example, each session-maintaining message of protocol A to protocol C may be transmitted every 10 seconds and the normal mode and the low power consumption mode may be switched every 10 seconds.

INDUSTRIAL APPLICABILITY

The communication apparatus and the power supply method according to the present invention are particularly suitable for use in transmitting packets on a regular basis to maintain session.

The invention claimed is:

1. A communication apparatus comprising:
a protocol processing section configured to execute processing of a plurality of different protocols;
a timing adjusting section configured to adjust transmission intervals of messages such that the messages of the respective protocols for maintaining a connection with a communicating party are transmitted in synchronization with each other, such that each adjusted transmission interval for each protocol is a multiple of a minimum value;
a transmission section configured to synchronously transmit the messages of the respective protocols at the adjusted transmission intervals; and
a power save control section configured to reduce supply of power in a time period in between the adjusted transmission intervals.

2. The communication apparatus according to claim 1, wherein the minimum value is a minimum value of the transmission intervals of the messages of the respective protocols.

3. The communication apparatus according to claim 2, wherein the timing adjusting section is configured to adjust each transmission interval for each protocol to be the same as or shorter than a transmission interval before the adjustment.

4. A method of supplying power, comprising the steps of:
performing processing of a plurality of different protocols;
adjusting transmission intervals of messages such that the messages of the respective protocols for maintaining a connection with a communicating party are transmitted in synchronization with each other, such that each adjusted transmission interval for each protocol is a multiple of a minimum value;
synchronously transmitting the messages of the respective protocols at the adjusted transmission intervals; and
reducing supply of power in a time period in between the adjusted transmission intervals.

5. The communication apparatus according to claim 1, wherein the minimum value is shorter than a minimum value of the transmission intervals of the messages of the respective protocols.

6. The communication apparatus according to claim 1, wherein the minimum value is a divisor of a minimum value of the transmission intervals of the messages of the respective protocols.

7. The communication apparatus according to claim 1, wherein the power save control section is configured to stop supply of power in the time period in between the adjusted transmission intervals.

8. The communication apparatus according to claim 7, wherein the time period in between the adjusted transmission intervals is a time period in which processing of the protocols is not carried out and the messages are not transmitted.

* * * * *